United States Patent Office 2,907,757
Patented Oct. 6, 1959

2,907,757
ETHYLENE POLYMERIZATION CATALYSTS

Nicholas George Merckling, Wilmington, Del., assignor to E. I. du Pont de Nemours and Company, Wilmington, Del., a corporation of Delaware No Drawing. Application March 28, 1955
Serial No. 497,405

8 Claims. (Cl. 260—94.9)

This invention relates to novel catalyst systems and more particularly to novel initiator systems used in the production of solid ethylene polymers and the process of polymerizing ethylene using said initiator systems.

Heretofore, it has been widely known that ethylene can be converted to solid polymers under very high pressures in the presence of catalysts which are capable of yielding free radicals under polymerization conditions.

It has also been known heretofore (U. S. Patents 2,212,155, 2,475,520, 2,467,234) that certain metal alkyls and Grignard reagents are capable of initiating the conversion of ethylene to solid polymers through a free radical mechanism. Ethylene has also been converted to solid polymers in the presence of hydrogenation catalysts, particularly in the presence of alkali metals or alkali metal hydrides (British Patent 536,102).

Generally speaking, Friedel-Crafts type catalysts have not been effective for converting ethylene to solid polymers but instead have resulted in the formation of liquid polymers from ethylene; however, it has recently been reported that solid polymers admixed with oils can be obtained by polymerizing ethylene in the presence of aluminum chloride and titanium chloride at elevated temperatures and pressures and advantageously in the presence of HCl-binding metals like aluminum powder (Fischer, German Patent 874,215, ausgegeben April 20, 1953).

Redox systems have frequently been disclosed for polymerization of olefinic compounds. In the past, redox systems have resulted in the formation of highly branched low density polymers, except at extremely high superpressures, at which high density ethylene polymers have been obtained heretofore. In many of these systems a heavy metal compound was employed in combination with a reducing component (cf. U.S. Patents 2,380,473 and 2,383,-425). While various theories have been advanced as to the mechanism of polymerization in redox systems, the art of polymerizing olefins in the presence of such combinations of catalyst components has not heretofore advanced to the state at which predictions could be made as to which pairs of oxidizable and reducible components might give good results in the conversion of ethylene to solid polymers except, of course, by further experimentation.

It has been discovered in accordance with the present invention that highly useful effects are produced by combining yttrium or scandium compounds with reducing agents. In specific embodiments it has been found that yttrium or scandium compounds in which the metal may be combined with radicals (suitable examples being alkoxy radicals, alkyl radicals and radicals which form acids when combined with hydrogen), when contacted with reducing agents form compositions which can be used effectively in the polymerization of ethylene. The interaction involved in the formation of the catalytically active system is not clearly understood at the present time. It appears, that a catalytically active complex may be formed, and that this is capable of coordinating with ethylene or ethylenically unsaturated hydrocarbon compounds, and quite possibly, this phenomena has a bearing on the mechanism of the polymerization. It is believed that the coordination complexes obtained on reacting yttrium or scandium with reducing agents in the presence of ethylene or ethylenically unsaturated hydrocarbon compounds are novel compounds, which heretofore have not been employed in the polymerization of ethylene or other ethylenically unsaturated hydrocarbons.

The nature of these coordination complexes is not fully understood, but they are active catalysts or catalyst components which are capable of initiating the polymerization of ethylene in an extremely active manner to produce solid ethylene polymers. The density of the polymers obtained through the use of these coordination complexes generally exceeds, at least to some extent, the density of polyethylene prepared by the use of previously disclosed free radical types of catalyst, except those free radical polymerization processes which employ such extremely high pressures or other unusual conditions, so as to produce abnormally-high density polyethylene as compared with polyethylene made at moderately high pressure (700–1200 atmospheres) by a free radical polymerization process (cf. U.S. Patent 2,586,833).

While the polymerization of ethylene to produce solid polymers in the presence of the catalysts herein disclosed can be carried out under mild conditions, it is preferable from an economic standpoint to employ moderately high pressures, suitable from 10 to 200 atmospheres or higher, in order to facilitate the handling of ethylene. Much higher pressures, up to several thousand atmospheres, can be employed, but it is not economically desirable to do this in view of the extraordinary activity of the catalysts at lower pressures. Similarly, extremely low temperatures may be employed. The temperatures used in the practice of this invention are within the range of about 0° C. to 300° C. A preferred temperature range is from 100° C. to 250° C.

The polymerization of ethylene according to the process of this invention, takes place most satisfactorily when the polymerization mixture is substantially moisture-free and also free of other sources of hydroxyl groups. As in numerous other ethylene polymerization processes, the polymerization mixture in the process of this invention is preferably kept free of oxygen since oxygen reacts with the catalyst. The polymerization is further preferably carried out in the presence of an inert organic hydrocarbon medium. Hydrocarbon solvents useful for this purpose are saturated alkanes and cycloalkanes such as cyclohexane and aromatic solvents such as benzene, toluene and xylene.

The reducing agents which are effective in reacting with the yttrium and scandium compounds to form the catalytically active complex are compounds which have at least one metal to hydrocarbon or at least one metal to hydrogen bond and active reducing metals. In these classes the following may be mentioned:

(1) Grignard reagents.
(2) Metal alkyls or aryls and similar organometallic compounds.
(3) Metal hydrides.
(4) Alkali or alkaline earth metals.

Of these reducing agents the compounds having at least one metal to hydrocarbon bond such as the Grignard reagents and the metal alkyls are preferred.

In specific embodiments the catalyst described in the process of this invention may be used in a dissolved form or in a finely dispersed form. The catalyst may be prepared in situ or in a prior step. In the latter case caution should be exercised to keep the catalyst mixture free from oxygen and moisture.

The invention is illustrated further by means of the following examples:

*Example 1.*—Into a stainless steel pressure vessel having a capacity of 330 ml. was charged under a blanket of nitrogen, 100 ml. of dry benzene admixed with 0.0025 mole of yttrium trichloride and 0.01 mole of phenylmagnesium bromide dissolved in a minimum quantity of diethyl ether. The pressure vessel was flushed with ethylene and pressured to 1000 p.s.i. with ethylene and heated to 100° C. The vessel was agitated for a period of one hour maintaining pressure and gradually increasing the temperature to 200° C. At the end of that period the vessel was cooled to room temperature, excess ethylene was vented off and the reaction mixture was filtered. After washing and drying the polymer obtained from the filtration weighed 1 gram. The polymer could be molded into tough films by heating under pressure to 190° C. The polymer was found to have a density of 0.96 and infrared analysis indicated less than 0.4 methyl groups per 100 carbon atoms.

*Example 2.*—Into a stainless steel pressure vessel having a capacity of 330 ml. was charged under a blanket of nitrogen 100 ml. of dry benzene admixed with 0.0075 mole of scandium trichloride and 0.03 mole of phenylmagnesium bromide dissolved in a minimum quantity of diethyl ether. The pressure vessel was flushed with ethylene and pressured to a 1000 p.s.i. with ethylene and heated to 100° C. The vessel was agitated for a period of one hour maintaining pressure and gradually increasing the temperature to 200° C. At the end of that period the vessel was cooled to room temperature, excess ethylene was vented off, and the resulting reaction mixture was filtered. After washing and drying the yield of the polymer obtained from the filtration was 3 grams. The polymer could be molded into tough films by heating under pressure to 190° C. The polymer was found to have a density of 0.96 and was soluble in boiling tetrahydronaphthalene.

It is to be observed that the foregoing examples are illustrative only and that numerous embodiments of the invention will occur to those who are skilled in the art.

As hereinabove indicated, the reducing component of the polymerization mixture can be varied rather widely, but it is essential that the reducing component be a sufficiently strong reducing agent and also that it be employed in sufficient quantity to react with the yttrium and scandium compounds to form the active complex. The ratio of the yttrium or scandium compound to the reducing agent is preferably from 0.5 to 6 in the case of organometallics.

The products obtained by polymerizing ethylene with catalysts hereinabove disclosed are solid polymers exclusively and are not contaminated with Friedel-Crafts type of oily polymers.

The quantity of catalyst employed can be varied over a rather wide range. It is desirable to employ a quantity of catalyst which is at least large enough to produce a reasonably rapid rate for a reasonably long period of time. Suitably, the preferred quantity is within the range of 0.001% to 10% based on the weight of the yttrium and scandium metal for the weight of monomer employed.

The polymers which are made under the conditions hereinabove described frequently have such high molecular weights that removal of catalyst by dissolving and filtering is extremely difficult. The best procedure for obtaining the polymer in a clean form is to wash with acetone-hydrochloric acid mixture in a Waring Blendor several times followed by washing with acetone and thereafter, if necessary, followed by several acetone-aqueous sodium hydroxide washes and finally by acetone-water wash. The products thus obtained are generally white. While this procedure is highly satisfactory for preparing clean polymers, it is to be understood that simpler procedures such as treatment with water at elevated temperatures will be entirely suitable for various practical applications. For some applications it may not be essential to remove traces of catalyst.

The structure of the polyethylene made in accordance with the process of this invention evidently is characterized by being essentially a straight chain hydrocarbon, with vinyl groups at one or both ends of at least some of the molecules. The infrared measurements indicate very little methyl substitution and a very small number of vinylidene groups with little or no transunsaturation or carbonyl groups.

The catalysts used in the process of this invention are well suited for the polymerization of ethylenically unsaturated compounds other than ethylene, such as propylene, butadiene, styrene, etc., and may also be used in the copolymerization of ethylene with such hydrocarbon monomers as propylene, butene, and the like.

The ethylene polymers obtained in accordance with the process of this invention are valuable in numerous applications, especially in the form of films, molded articles, and extruded insulation on wire.

I claim:

1. A polymerization catalyst composition essentially consisting of the product obtained on admixing in the presence of an inert hydrocarbon solvent, a halide of the class consisting of yttrium and scandium halides with a Grignard reagent, the ratio of said halide to said Grignard reagent being from 0.5 to 6.

2. A polymerization catalyst composition essentially consisting of the product obtained on admixing in the presence of an inert hydrocarbon solvent, yttrium chloride with a Grignard reagent, the ratio of said halide to said Grignard reagent being from 0.5 to 6.

3. A composition of matter set forth in claim 2 wherein the Grignard reagent is phenylmagnesium bromide.

4. A polymerization catalyst composition essentially consisting of the product obtained on admixing in the presence of an inert hydrocarbon solvent, scandium chloride with a Grignard reagent, the ratio of said halide to said Grignard reagent being from 0.5 to 6.

5. A composition of matter set forth in claim 4 wherein the Grignard reagent is phenylmagnesium bromide.

6. The process of polymerizing ethylene which comprises contacting ethylene, at a temperature of 0 to 300° C. in the presence of an inert hydrocarbon solvent, with from 0.001 to 10% by weight of said ethylene of a catalyst, said catalyst consisting essentially of the product obtained on admixing in said solvent a halide of the class consisting of yttrium and scandium halides and a Grignard reagent, the ratio of said halide to said Grignard reagent being from 0.5 to 6, and recovering a polymer of ethylene.

7. The process of polymerizing ethylene which comprises contacting ethylene, at a temperature of 0 to 300° C., in the presence of an inert hydrocarbon solvent, with from 0.001 to 10% by weight of said ethylene of a catalyst, said catalyst consisting essentially of the product obtained on admixing in said solvent yttrium chloride with phenyl magnesium bromide, the ratio of said chloride to said phenyl magnesium bromide being from 0.5 to 6, and recovering a polymer of ethylene.

8. The process of polymerizing ethylene which comprises contacting ethylene at a temperature of 0 to 300° C., in the presence of an inert hydrocarbon solvent, with from 0.001 to 10% by weight of said ethylene of a catalyst, said catalyst consisting essentially of the product obtained on admixing in said solvent scandium chloride with phenyl magnesium bromide, the ratio of said chloride to said phenyl magnesium bromide being from 0.5 to 6, and recovering a polymer of ethylene.

References Cited in the file of this patent

UNITED STATES PATENTS 2,475,520  Roedel _____ July 5, 1949
2,721,189  Anderson _____ Oct. 18, 1955

OTHER REFERENCES

Cotton: Chem. Rev., vol. 55, pages 554–55.